United States Patent [19]

Frihart et al.

[11] Patent Number: 4,830,671

[45] Date of Patent: May 16, 1989

[54] INK COMPOSITIONS FOR INK JET PRINTING

[75] Inventors: Charles R. Frihart; Mark S. Pavlin, both of Lawrenceville, N.J.

[73] Assignee: Union Camp Corporation, Wayne, N.J.

[21] Appl. No.: 98,447

[22] Filed: Sep. 18, 1987

[51] Int. Cl.$^4$ .............................................. C09D 11/06
[52] U.S. Cl. ........................................ 106/27; 106/20; 106/31; 106/248
[58] Field of Search .................... 106/20, 31, 27, 248; 260/DIG. 38; 523/160

[56] References Cited

U.S. PATENT DOCUMENTS 3,872,044  3/1975  Hervey et al. ...................... 523/160
4,256,818  3/1981  Blossey et al. ............. 260/DIG. 38
4,508,868  4/1985  Whyzmuzis et al. ................ 524/607
4,514,540  4/1985  Peck .................................... 524/514

OTHER PUBLICATIONS

Derwent Abstract Accession No. 87-050048/07, World Pat. No. WO8700797, Feb. 12, 1987.
Derwent Abstract Accession No. 86-123160/19, Japanese Pat. No. J61063495, Apr. 1, 1986.
Derwent Abstract Accession No. 86-234545/36, Japanese Pat. No. J61162387, Jul. 23, 1986.

*Primary Examiner*—Amelia Burgess Yarbrough
*Attorney, Agent, or Firm*—Edward J. Sites

[57] ABSTRACT

An ink composition is proved having the properties of stability and uniformity of performance under ink jet printing conditions and desired printing properties can be obtained with hot melt ink compositions consisting of a resinous binder comprised of a compound of the formula

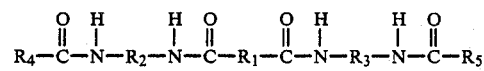

wherein $R_1$ represents a polymerized fatty acid residue with two carboxylic acid groups removed $R_2$ and $R_3$ are the same or different and each represent an alkylene with up to 12 carbon atoms, a cycloalkylene with 6 to 12 carbon atoms, an arylene with 6 to 12 carbon atoms or an alkarylene with 7 to 12 carbon atoms and $R_4$ and $R_5$ are the same or different and each represents an alkyl having up to 36 carbon atoms, a cycloalkyl having up to 36 carbon atoms and aryl having up to 36 carbon atoms or an alkaryl having up to 36 carbon atoms said resinous binder having a melt viscosity of less than 250 CPS at 50 degrees C and a colorant distributed through the resinous binder in an effective amount sufficient to impart a predetermined color to the resulting hot melt ink composition.

15 Claims, No Drawings

INK COMPOSITIONS FOR INK JET PRINTING

This invention relates to resinous binders and more particularly is concerned with ink compositions for ink jet printing.

BACKGROUND OF THE INVENTION

Ink jet printing is a well known poocess for non-contact printing of substrates such as paper, plastic films, metal foils and the like. In the operation of a typical ink jet printing apparatus a stream of an ink composition is forced under pressure through a very small orifice by a drive means such as a driven piezoelectric crystal. After the stream of the ink composition is forced from the orifice the stream separates into minute uniform size droplets. The droplets of the ink composition then receive an electrical charge. The charged droplets are deflected causing selected droplets to impinge upon the substrate to be printed in a predetermined pattern to form a dot matrix image of the desired indicia on the substrate.

Various types of ink jet printing apparatus are known in the art. One of the more common types of ink jet printing apparatus provides a constant discharge of droplets of the ink composition in substantial excess of the amount actually required for printing with the excess droplets being recovered and recycled. Another well known type of ink jet printing apparatus is referred to as a drop on demand printer. This type of apparatus, as the name indicates, discharges a stream of droplets of the ink composition only when required for printing. There are other types of ink jet printers known in the art and all typically operate on the same general principles as those described above.

The various types of apparatus used for ink jet printing are relatively well developed from a mechanical standpoint. However, considerable problems are still encountered with ink jet printers. Many of the problems are related to the ink compositions heretofore suggested for use in ink jet printing. Ink compositions which are used in ink jet printing should have certain properties. Initially in dispensing of the ink compositions during printing it is necessary that the ink compositions display a consistant breakup length, drop viscosity, and drop charge under the specific set of conditions employed during the ink jet printing process. To meet this requirement, the ink jet compostion must have stable viscosity and resistive properties and should not dry out upon aging. One of the major problems encountered with conventional prior art ink compositions is that they contain substantial amounts of either water or organic solvents which upon standing evaporate ink compositions to dry out and cake. This causes blocking the orifices and considerable other problems in operation of ink jet printers. A further problem is that the loss of the volatile solvents causes the inks to increase in viscosity which will cause substantial changes in the performance of the inks.

In addition to the unique requirements associated with ink jet printing it is also necessary that the ink compositions used for ink jet printing have the usual desired printing properties that can be obtained with inks used in conventional printing processes. These properties include, for example, that the ink composition have satisfactory adhesion to the various of different types of substrates on which it may be printed. In addition, the indicia which is printed must have a high degree of resolution in order to provide the sharp images required for most printing applications. The ink composition must not rub or smudge on the substrate and the printed indicia should likewise be permanent; that is, of archival quality.

A further problem in addition to those noted above associated with the presence of volatile solvents in the prior ink compositions used for ink jet printing is that the solvents cause the printed indicia to bleed into the substrates and result in poor resolution. To overcome this, the prior art resorted to the expedience of using coated papers which will not be wet out by the ink compositions. This is generally limited in practice, because of the additional cost involved and the requirement in many commercial printing process for "plain paper" printing. The use of large amounts of solvents in the ink composition likewise required that the printed substrates be subjected to drying to remove the solvents. In the case of organic solvents this has caused additional health and safety concerns.

Certain of the prior art ink compositions in addition to containing solvents also contain substantial amounts of wetting agents to allow the ink copposition to wet out and saturate the substrate to be printed. These particular ink compositions tend to excessively wet out the substrates with solvents and in turn cause bleeding with a resulting substantial reduction in the resolution of the printed indicia.

In typical conventional ink compositions for most other printing applications that is aside from ink jet printing, pigments are used as the colorants. Pigments are preferred to dyes because of the cost, consistent color quality and more importantly becuase of their outstanding permanency. However, because of the problems encountered with the prior art ink compositions used in ink jet printing and particularly because of the drying out of the solvents from prior art ink compositions it has not been possible to successfully use pigments in ink compositions for ink jet printing.

What would be highly desirable would be an ink composition for ink jet printing which would be stable under ink jet printing conditions and which provides excellent print qualities such as high resolution pattern with a high contrast, excellent adhesion to the substrate and also excellent archival properties.

SUMMARY OF THE INVENTION

It has been found that in accordance with the present invention that an ink composition having properties of stability and uniformity of performance under ink jet printing conditions and desired printing properties can be obtained with hot melt ink compositions which have as the binder a polyamide hot melt adhesive which has a low viscosity for example 250 CPS or less at a low melt temperature of for example 150 degrees C. More particularly it has been found that excellent results are obtained with hot melt ink compositions consisting of (a) a resinous binder comprised of the compound of the formula

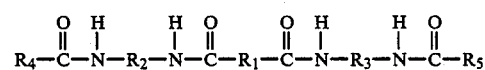

wherein $R_1$ represents a polymerized fatty acid residue with two carboxylic acid groups removed, $R_2$ and $R_3$ are the same or different and each represent an alkylene with up to 12 carbon atoms, a cycloalkylene with 6 to 12 carbon atoms, an arylene with 6 to 12 carbon atoms or an alkarylene with 7 to 12 carbon atoms and $R_4$ and $R_5$ are the same or different and each represents an alkyl having up to 36 carbon atoms, a cycloalkyl having up to 36 carbon atoms and aryl having up to 36 carbon atoms or an alkaryl having up to 36 carbon atoms, wherein said resinous binder has a melt viscosity of 250 CPS or less at 150 degrees C. and (b) a colorant distributed through the resinous binder in an effective amount sufficient to impart a predetermined color to the resulting hot melt ink composition.

DETAILED DESCRIPTION OF THE INVENTION

The essential component of the ink composition of the present invention is preferably a resinous binder which is prepared by the condensation reaction of about one stoichiometric equivalent of polymerized fatty acid, about two stoichiometric equivalents of a diamine and about two stoichiometric equivalents of a monocarboxylic acid. The principal product which is obtained as a result of the condensation reaction is itself considered unique and useful aside from its use in the ink composition of this invention.

The polymerized fatty acids which are used in the preparation of the resinous binder are obtained by the polymerization of olefinically unsaturated monocarboxylic acids containing 16 to 23 carbon atoms, such as oleic acid, linoleic acid, linolenic acid, eleostearic acid and the like. Dicarboxylic acids produced in this manner, that is, when two moles of the monocarboxylic acid are combined, are referred to as dimer acids. Processes for the production of dimer acids are well known to the art. $C_{36}$ dimer acids obtained by the dimerization of an unsaturated $C_{18}$ acid such as oleic acid, linoleic acid and mixtures thereof (e.g. tall oil fatty acids) are especially useful and advantageously employed for the preparation of the resinous binder. Such dimer acids have as their principal component a $C_{36}$ dicarboxylic acid and typically have an acid value in the range 180–215 and neutral equivalent from 265–310. Dimer acids containing less than 30% by weight by-product acids including monobasic acids, trimer acids or higher polymer acids are especially useful for this invention. It is even more advantageous if the dimer acid is hydrogenated prior to use. The dimer acids may also be molecularly distilled or otherwise purified to increase the $C_{36}$ dimer content to 90% or more.

The second reactant used in the preparation of the resinous binder is a diamine which can be represented by the formula

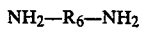

wherein $R_6$ represents an alkylene with up to 12 carbon atoms, a cycloalkylene with 6 to 12 carbon atoms, an arylene with 6 to 12 carbon atoms or an alkarylene with 7 to 12 carbon atoms.

The diamines which are used in this invention are well known in the art as is their preparation and many are readily available commercially. The selection of the particular diamine for use in the preparation of the resinous binder of the present invention is dependent upon the properties desired in the ink compositions of the present invention. It should be appreciated that use of different types of diamines in the preparation of the resinous binder will change the temperature and the viscosity at the melt point of the resinous binders which are obtained.

It has been found that the most preferred resinous binder used in this invention are prepared with lower alkylene diamines and particularly those having up to 6 carbon atoms. More particularly it has been found that exceptional results are obtained with ethylene diamine or hexamethylene diamine. It is possible to use a mixture of diamines in the preparation of the resinous binder but it has been found that more consistent results from batch to batch are obtained when a single type of diamine is used in the preparation.

The third reactant used in the preparation of the resinous binder is a monocarboxylic acid of the formula

wherein $R_7$ represents an alkyl having up to 36 carbon atoms, a cycloalkyl having up to 36 carbon atoms and aryl having up to 36 carbon atoms or an alkaryl having up to 36 carbon atoms. The preferred monocarboxylic acid for use in the preparation of the resinous binder are fatty acids and particularly saturated fatty acids as these acids tend to form resinous binder which are tack free. One fatty acid which has been found to be especially useful in this regard is stearic acid as it provides an exceptionally tack free product.

The preferred method for the preparation of the resinous binder is to conduct the condensation reaction in a series of steps. In the initial step, one stoichiometric equivalent of the polymerized fatty acid is reacted with slightly more than two stoichiometric equivalents of the selected diamine or mixture of diamines in the presence of a catalyst such as, phosphoric acid at a temperature of 150 to 200 degrees C. until the initial condensation reaction is completed. Thereafter about two stoichiometric equivalents of the selected monocarboxylic acid or mixture thereof is added to the reaction mixture and the reaction continued until the second condensation reaction is completed.

An alternate method for the preparation of the resinous binder is to add all of the reactants at one time. In this particular method the polymerized fatty acids, the diamine reactant, and the monocarboxylic acid reactant are blended together in the presence of catalyst and heated at 150 degrees to 200 degrees C. until the reaction is completed. It has been found that the reaction product of this mehhod is substantially the same as that obtained with the sequential addition as noted above. There are however minor amounts of other reaction products which would be anticipated from this particular type of preparation. However the amounts of the addition products are not significant and indeed the additional products appear to somewhat help the overall properties of the ink composition produced in accordance with this method.

The resinous composition produced in accordance with this invention are characterized by having physical properties which make them especially useful for use in ink jet printing compostions. In particular the resinous binders of this invention have a relatively low melting point and consistent low melt viscosity. The resinous binders of this invention typically have a viscosity of 250 CPS or less at 150 degrees C. which make them especially useful in ink jet printing applications. The relatively low viscosity together with the stable properties under ink jet printing condition makes it possible to formulate ink jet compositions without volatile solvents and which can be used over extended periods of time with consistent results. This type of result was not heretofore obtainable with the prior art ink compositions. Additional properties of the resinous binders of the present invention is that they have exceptional adhesion to a wide variety of substrates including paper, both coated and uncoated, plastic film and metal in the molten (hot melt) state and form exceptional strong bonds to the substrates when solidified. A further additional benefit of the resinous binder itself is that because of the presence of the many amide linkage the resinous binder is an excellent solvating agent for certain additives including selected types of dyes.

The resinous binder most preferably used in ink composition are those wherein $R_2$ and $R_3$ are lower alkylene having up to 6 carbon and most preferable are ethylene or hexamethylene and wherein $R_4$ and $R_5$ are saturated alkyl groups with stearyl being the most preferable end group. The most preferred resinous binder for use in ink compositions is represented by the formula

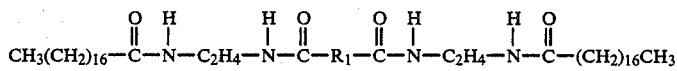

In printing ink compositions containing the above defined preferred class of resinous binder an expectional combination of stability during ink jet printing, high resolution printing pattern, excellent adhesion to printed substrate and overall excellent print properties are readily obtained.

The second essential ingredient of the ink jet compositions of this invention is the colorant. The generic term colorant is specifically used in this specification in that it is intended to refer to both pigments and dyes which impart a distinct color to the composition used for ink jet printing. The purpose of any colorant is to provide contrast between the color of the substrate and the color of ink in order oo provide a visually identifiable indicia on the substrate. In the prior art, with most ink jet compositions, it was necessary to use solubilized dyes as the colorant. The dyes were solubilized using a volatile solvent in the ink composition which would dissolve the dye so as to be miscible with the resin used as the binder in the ink composition. While soluble dyes do provide adequate colorant in certain situations, they are both less effective and clearly considerably more costly than the pigments typically used with conventional ink composition. This is particularly true with regard to ink compositions which are desired to have archival properties.

It has been found within the compositions of the present invention the colorant can be either a dye or a pigment. It has also been found that it is possible to use a combination of both dyes and pigments to obtain a combination effect. In addition many dyes can be effectively used in the composition of the present invention without the use of volatile solvents in that the high concentration of amide linkages in the resinous binder has a significant solvating effect on many dyes.

The ink compositions of this invention in addition to containing the resinous binder and a colorant can advantageously contain additional conventional additives for imparting certain properties to the ink composition. One type of additive which is useful is a solvating agent for the dyes which is nonvolatile at the temperature at which the ink compositions will be printed. High melting plasticizers having a melting temperature above the temperature at which the ink composition will be printed can likewise be added to improve the mechanical properties of the ink compositions. A still further example of an additive which can be used are materials such as low viscosity waxes and the like which likewise are nonvolatile at the printing temperature to reduce the viscosity of the ink composition. Other additives such as agents to modify the conductivity of the ink composition can also be added to the ink composition.

The ink compositions of this invention are prepared by physically blending together the components used to formulate the composition into a substantially homogeneous mixture. The components can be mixed in a finely divided state and then the mixture melted to complete the blending of the components together. It has been found however that it is preferable to initially melt the resinous binder and then blend each of the additives into the molten resinous binder. The resulting molten mixture is then cast into an appropriate size shape for use in a hot melt ink jet printers.

In the use of the ink compositions of the present invention the ink composition is initially heated in the ink jet printer to a temperature which is somewhat above the melting point of the ink composition but below the temperature at which the components of the ink composition will volatilize or decompose. The molten ink composition is then fed into a printing head including heating elements for maintaining the ink composition in the molten state. The ink jet printing head is maintained at a predetermined temperature which is preselected for the printing process. As the ink composition is required to form a printed indicia on a substrate it is dispensed in much the same manner as conventional ink compositions used in ink jet printing. The stream of the molten ink composition is forced from the orifice and the droplets form as the ink composition is directed towards the substrate to be printed. The molten or semi-molten ink droplets then contact the substrate and adhere to the substrate. The temperature is generally selected so that the ink composition will almost immediately solidify on contact with the substrate and bond to the substrate. No further treatments are required to fix the printing indicia on the substrate. Any ink droplets which are not used in the printing process are recycled to the supply chamber where they are melted and reintroduced into the ink jet printer head. No substantial change has been noted in the performance of the ink composition over an extended period even though a substantial portion of the ink particles are recirculated in the printing process. In addition, it has been found that the use of the hot melt ink composition in the ink process prevents the formation of caking or the like at the orifice of the ink jet printers. If upon shutting down the ink jet printer any ink composition is left at the orifices once the ink jet printer is restarted the heating elements in the ink jet printer head cause the deposited solidified ink composition to remelt and be useful in the printing process.

What is claimed is:

1. The composition which comprises the condensation reaction product of: (a) one stoichiometric equivalent of polymerized fatty acid, (b) about two stoichiometric equaivalents of a diamine or a mixture of diamines of the formula $NH_2$-$R_6$-$NH_2$ wherein $R_6$ is an alkylene having up to 12 carbon atoms, a cycloalkylene having 6 to 12 carbon atoms, an arylene have 6 to 12 carbon atoms or an alkarylene having 6 to 12 carbon atoms, and (c) about two stoichiometric equivalents of a monocarboxylic acid or a mixture of monocarboxylic acids of the formula $R_7$-COOH wherein $R_7$ is an alkyl having up to 36 carbon atoms, an aryl having up to 36 carbon atoms or an alkaryl having up to 36 carbon atoms, and a colorant distributed through the reaction product in an effective amount sufficient to impart a predetermined color to the resulting composition.

2. A hot melt ink composition for use ink jet printing comprised of (a) tetraamide having a viscosity of 250 CPS or less at a temperature of 150 degrees C. and (b) a colorant distributed through the tetraamide in an effective amount sufficient to impart a predetermined color to the resulting hot melt ink composition.

3. A hot melt ink composition for use in ink jet printing comprised of:
   (a) a resinous binder comprised of the compound of the formula

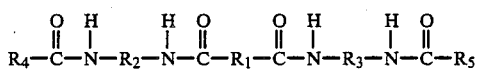

wherein $R_1$ represents a polymerized fatty acid residue with two carboxylic acid groups removed, $R_2$ and $R_3$ are the same or different and each represent an alkylene with up to 12 carbon atoms, a cycloalkylene with 6 to 12 carbon atoms, an arylene with 6 to 12 carbon atoms or an alkarylene with 7 to 12 carbon atoms, and $R_4$ and $R_5$ are the same or different and each represents an alkyl having up to 36 carbon atoms, a cycloalkyl having up to 36 carbon atoms and aryl having up to 36 carbon atoms or an alkaryl having up to 36 carbon atoms said resinous binder having a melt viscosity of less than 250 CPS at 150 degrees C. and (b) a colorant distributed through the resinous binder in an effective amount sufficient to impart a predetermined color to the resulting hot melt ink composition.

4. The ink composition according to claim 3 wherein $R_2$ and $R_3$ are lower alkyls having up to 6 carbon atoms.

5. The ink composition according to claim 3 wherein $R_2$ and $R_3$ are ethylene radicals.

6. The ink composition according to claim 3 wherein $R_2$ and $R_3$ are each hexamethylene radicals.

7. The ink composition according to claim 3 wherein $R_4$ and $R_5$ are saturated alkyls.

8. The hot melt ink composition according to claim 3 wherein $R_4$ and $R_5$ are stearyl.

9. The hot melt ink composition according to claim 3 wherein the colorant is a pigment.

10. The hot melt ink composition according to claim 3 wherein the colorant is a dye.

11. The hot melt composition according to claim 3 wherein the colorant is a dye which is soluble in the resinous binder.

12. The hot melt ink composition according to claim 3 wherein the colorant is a dye and said composition further contains a solvent for the dye which is nonvolatile at the temperature at which the ink composition will be printed.

13. The hot melt ink composition according to claim 3 which further contains an effective amount of a placticizer which is nonvolatile at the temperature at which the ink composition will be printed.

14. The hot melt ink composition according to claim 3 which further contains effective amounts of viscosity reducing agent for the resinous binder which is nonvolatile at the temperature at which the hot melt composition will be printed.

15. The hot melt ink composition according to claim 3 wherein the resinous binder is represented by the formula

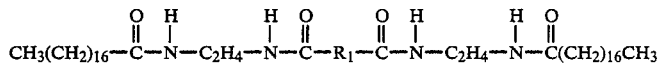

* * * * *